United States Patent
Ashikawa

(10) Patent No.: US 9,306,309 B2
(45) Date of Patent: Apr. 5, 2016

(54) OBD CONNECTOR PROTECTIVE COVER

(71) Applicant: ASHIKAWA CO., LTD., Tokyo (JP)

(72) Inventor: Tatsuya Ashikawa, Tokyo (JP)

(73) Assignee: Ashikawa Co., Ltd., Tokyo (JP)

( * ) Notice: Subject to any disclaimer, the term of this patent is extended or adjusted under 35 U.S.C. 154(b) by 0 days.

(21) Appl. No.: 14/533,599

(22) Filed: Nov. 5, 2014

(65) Prior Publication Data
US 2015/0155647 A1    Jun. 4, 2015

(30) Foreign Application Priority Data

Dec. 2, 2013    (JP) .................................. 2013-248952

(51) Int. Cl.
| | | |
|---|---|---|
| *H01R 13/44* | (2006.01) | |
| *H01R 13/436* | (2006.01) | |
| *B60R 25/00* | (2013.01) | |
| *H01R 13/639* | (2006.01) | |

(52) U.S. Cl.
CPC .............. *H01R 13/436* (2013.01); *B60R 25/00* (2013.01); *H01R 13/639* (2013.01); *H01R 13/6397* (2013.01); *H01R 2201/26* (2013.01)

(58) Field of Classification Search
CPC ............ H01R 13/436; H01R 13/6397; H01R 13/639; H01R 2201/26; B60R 25/00
USPC ..................... 439/34, 133, 134, 304
See application file for complete search history.

(56) References Cited

U.S. PATENT DOCUMENTS

| | | | | |
|---|---|---|---|---|
| 5,055,057 A |  | 10/1991 | Boyer et al. | |
| 5,330,361 A | * | 7/1994 | Brend ..................... | H01R 13/60 439/134 |
| 5,507,656 A | * | 4/1996 | Ales ................... | H01R 13/6397 439/133 |
| 5,848,905 A | * | 12/1998 | Patel ..................... | H01R 13/60 439/134 |
| 2007/0152503 A1 | | 7/2007 | Kowalick | |

FOREIGN PATENT DOCUMENTS

| | | |
|---|---|---|
| DE | 102012002694 A1 | 8/2013 |
| JP | 5083924 B1 | 11/2012 |
| WO | 2008033397 A2 | 3/2008 |

* cited by examiner

*Primary Examiner* — Khiem Nguyen
(74) *Attorney, Agent, or Firm* — Norris McLaughlin & Marcus, P.A.

(57) ABSTRACT

An OBD connector protective cover includes a clip provided with a pair of openable/closable lugs, a body cover that covers the entire clip including the pair of lugs, a key cylinder provided on a front of the body cover as opening/closing operation means for the pair of lugs and a socket provided on a rear face of the body cover as an opening for inserting a connection terminal section 101 of an OBD connector 100 into the body cover. The pair of lugs are closed through a key operation with the key cylinder, the connection terminal section 101 of the OBD connector 100 and the body cover are integrated together by the lugs holding the connection terminal section 101 of the OBD connector 100, and the body cover constitutes an obstacle to thereby disable access to the connection terminal section 101 from outside.

2 Claims, 5 Drawing Sheets

FIG. 1(b)
FIG. 1(a)
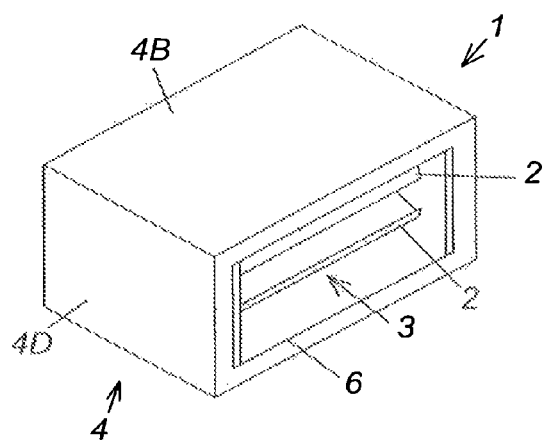
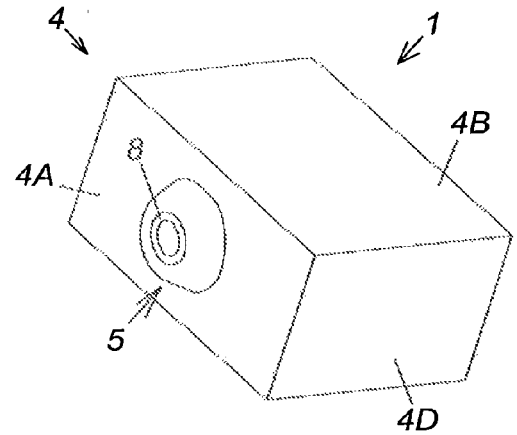
FIG. 1(d)
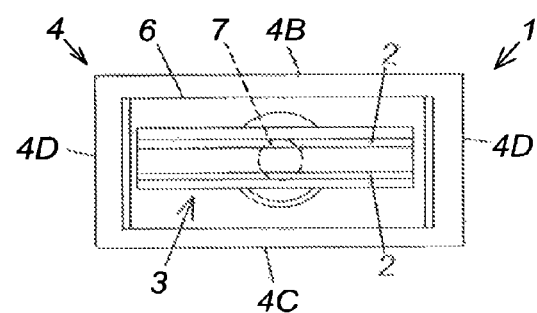
FIG. 1(c)
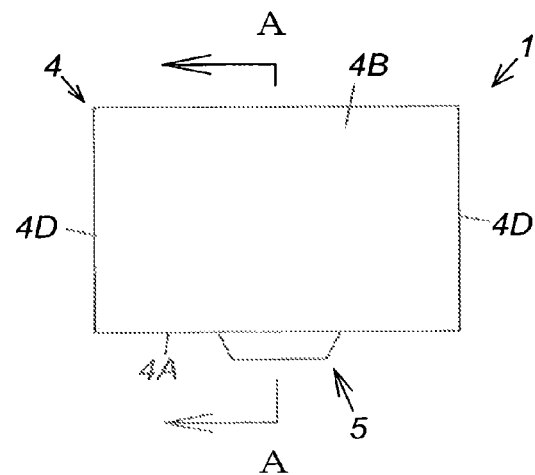

OBD CONNECTOR PROTECTIVE COVER

BACKGROUND OF THE INVENTION

1. Field of the Invention

The present invention relates to an OBD connector protective cover used as a cover that protects an OBD connector provided for a vehicle, and more specifically, to an OBD connector protective cover that allows anyone to simply prevent abuses of the OBD connector by one-touch operation.

2. Description of the Related Art

Vehicles equipped with a computer self-fault diagnosis function include an OBD (On-board diagnostics) connector connected to the computer as means for acquiring diagnosis results using the function. As means for preventing illegal access to this type of OBD connector, an OBD connector protective cover in the publication of Japanese Patent No. 5083924 is well-known.

The OBD connector protective cover of the publication of Japanese Patent No. 5083924 is enabled to accommodate the entire OBD connector from an opening (103) into a body section (102), and the opening (103) is closed with a key cylinder (120) and a slide cover (110) so as to disable illegal access (abuse) to the OBD connector.

However, for example, when the OBD connector mounted on a mounting plate of the vehicle is protected by the OBD connector protective cover of the publication of Japanese Patent No. 5083924 to thereby prevent abuses of the OBD connector, three operations are required at minimum, that is, operation of removing the OBD connector from the mounting plate of the vehicle, operation of accommodating the removed OBD connector in the body section (102) of the OBD connector protective cover, and operation of mounting the OBD connector protective cover at an original place (mounting plate of the vehicle) on which the OBD connector was originally mounted, which requires many operation man-hours, resulting in difficulty in simply preventing abuses of the OBD connector by one-touch operation.

Note that the aforementioned reference numerals in parentheses are ones used in Japanese Patent No. 5083924.

SUMMARY OF THE INVENTION

The present invention has been made to solve the above-described problems and it is an object of the present invention to provide an easy-to-use OBD connector protective cover to allow anyone to simply prevent abuses of the OBD connector by one-touch operation.

In order to attain the above object, the present invention provides an OBD connector protective cover that protects an OBD connector provided for a vehicle, comprising: a clip provided with a pair of openable/closable lugs; a body cover that covers the entire clip including the pair of lugs; a key cylinder provided on a front of the body cover as opening/closing operation means for the pair of lugs; and a socket provided in a rear face of the body cover as an opening for inserting a connection terminal section of the OBD connector into the body cover, in which the pair of lugs are closed through a key operation with the key cylinder, the connection terminal section of the OBD connector and the body cover are integrated together by the lugs holding the connection terminal section of the OBD connector, and the body cover constitutes an obstacle to thereby disable access to the connection terminal section from outside.

In the present invention, the key cylinder comprises a lock pin that can retractably protrude toward the clip direction, the clip comprises: a pair of lug plates, the lugs being formed at distal ends thereof; support means for pivotably supporting the pair of lug plates; and an elastic plate that is curved toward the lock pin and connects rear ends of the pair of lug plates, in which the elastic plate is pressed and flattened by the lock pin that protrudes from the key cylinder, the pair of lug plates are thereby rotated in a direction in which a distance between the rear ends of the pair of lug plates increases, and the pair of lug plates are rotated in a direction in which a distance between distal ends of the pair of lug plates decreases in association therewith, and the lugs of the respective lug plates are closed.

As a specific configuration of the OBD connector protective cover according to the present invention, particularly as a configuration in which the connection terminal section of the OBD connector is integrated with the body cover and the body cover thereby becomes an obstacle to disable access to the connection terminal section of the OBD connector from outside, the configuration has been adopted in which the socket is provided in the rear face of the body cover, the connection terminal section of the OBD connector is inserted from the socket into the body cover, and the inserted connection terminal section is held by the lugs of the clip. For this reason, for example, even when the OBD connector to be protected is firmly attached and fixed to the mounting plate of the vehicle, it is possible for anyone to simply prevent abuses of the OBD connector by one-touch operation of just inserting the connection terminal section into the socket without any need to remove the OBD connector from the mounting plate.

According to the OBD connector protective cover of the present invention, the key cylinder is provided on the front of the body cover, allowing anyone to clearly recognize the presence of the key cylinder at a glance, strongly appealing the presence of the key cylinder to an abuser of the OBD connector in particular, and as a result, achieving a high effect of preventing abuses, for example, giving up the abuse of the OBD connector.

BRIEF DESCRIPTION OF THE DRAWINGS

FIG. 1(*a*) and FIG. 1(*b*) are perspective views of an OBD connector protective cover to which the present invention is applied, FIG. 1(*c*) is a top view of the OBD connector protective cover and FIG. 1(*d*) is a rear view thereof.

DETAILED DESCRIPTION OF THE PREFERRED EMBODIMENTS

Hereinafter, a best mode for carrying out the present invention will be described in detail with reference to the accompanying drawings.

<<Overview of OBD Connector Protective Cover>>

Figure 2A:
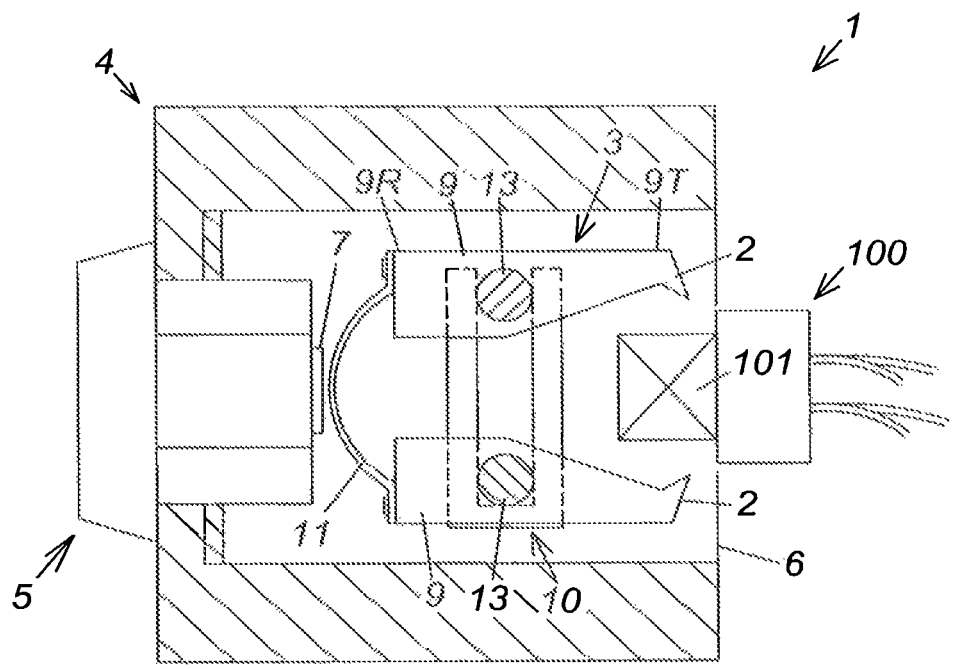
FIG. 2(*a*) and FIG. 2(*b*) are cross-sectional views along a line A-A in FIG. 1(*c*) of the OBD connector protective cover.
Figure 2B:
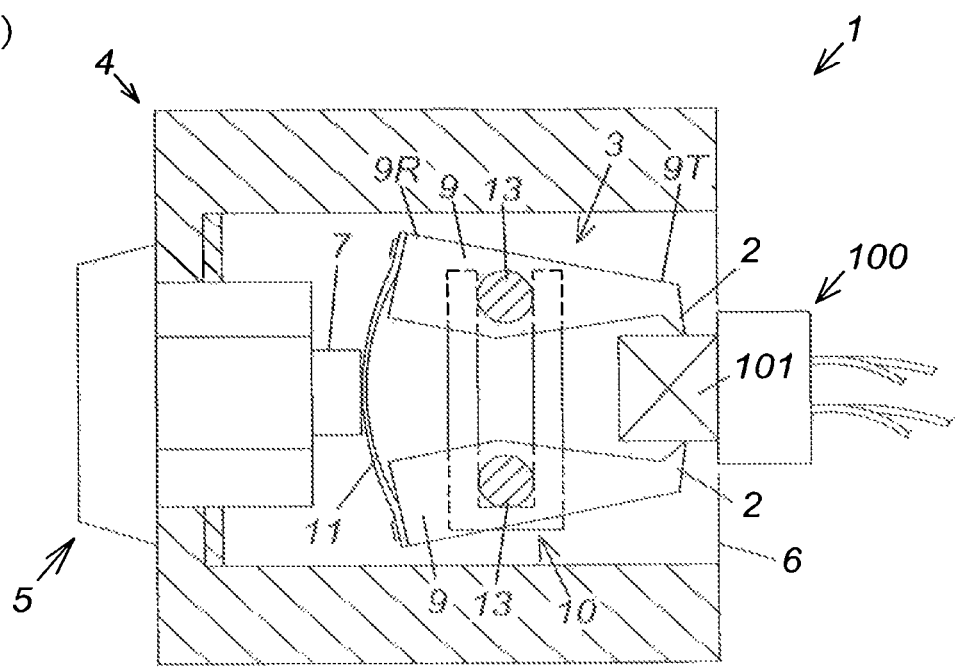
Figure 3:
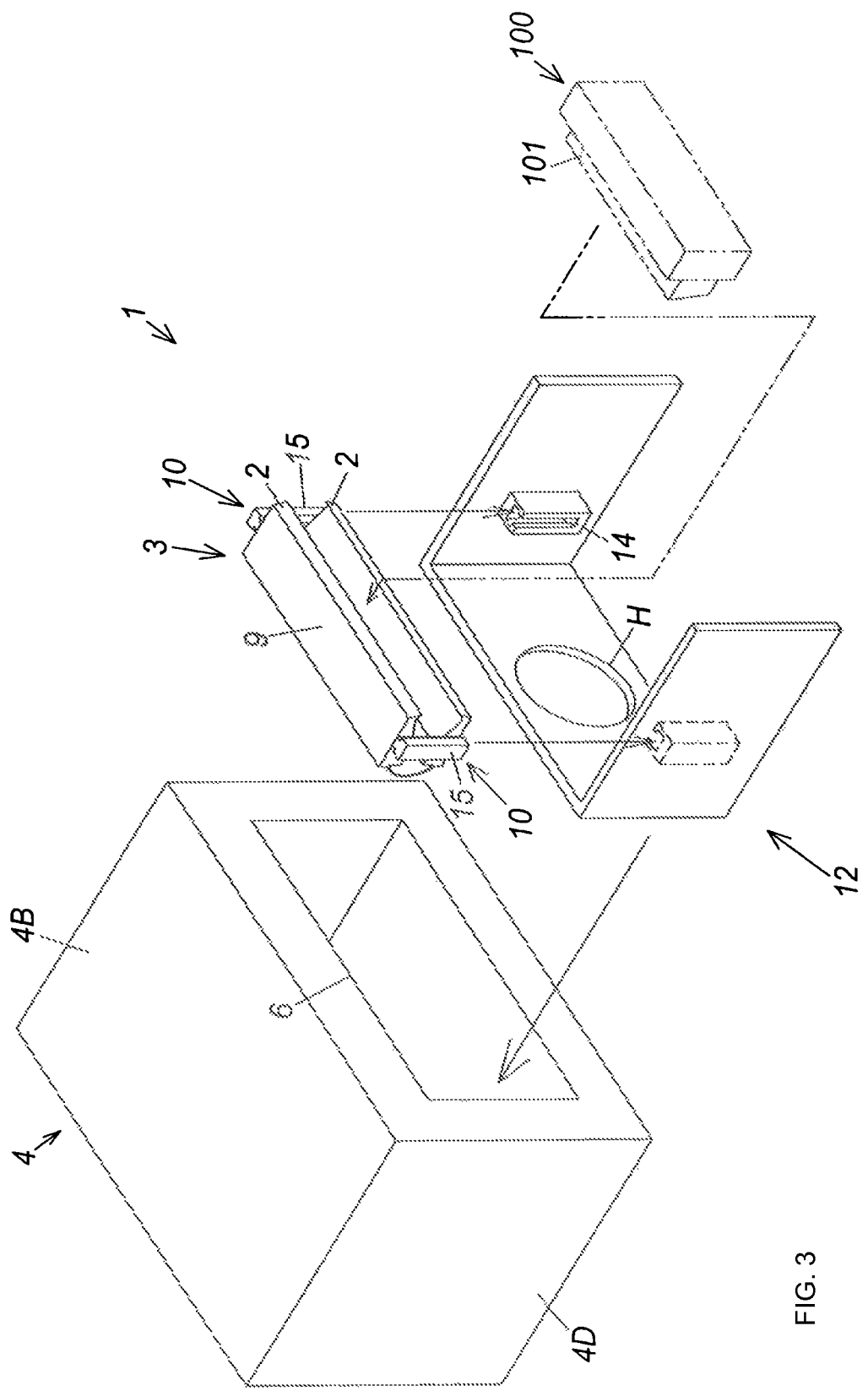
FIG. 3 is an exploded perspective view of the OBD connector protective cover in FIG. 1(*b*).
Figure 4A:
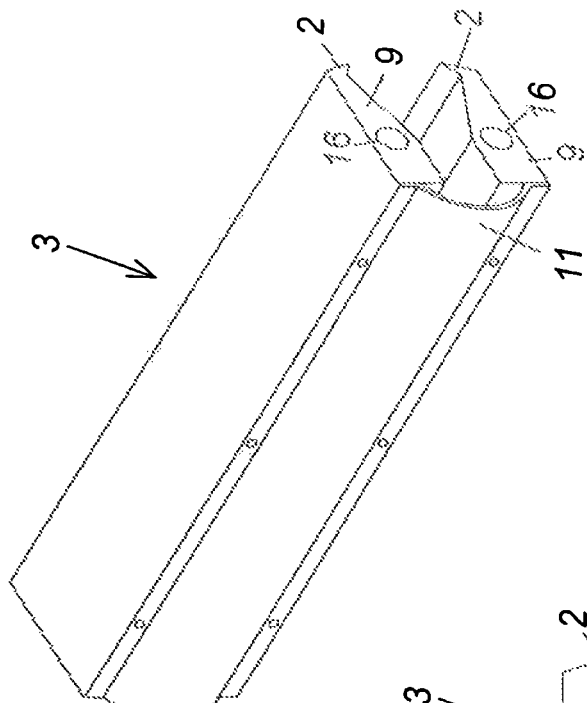
FIG. 4(*a*) and FIG. 4(*b*) are perspective views of a clip and FIG. 4(*c*) is a side view of the clip.
Figure 4C:
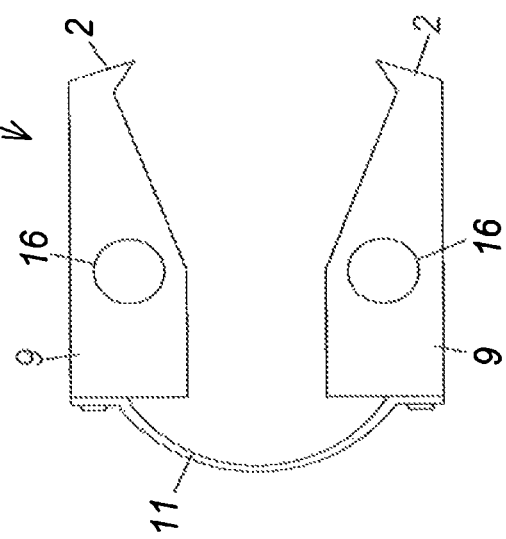
Figure 4B:
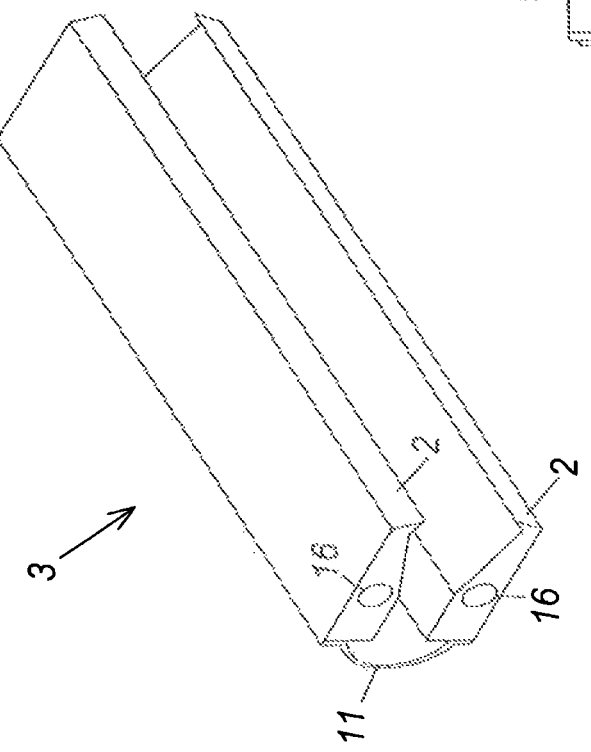
Figure 5:
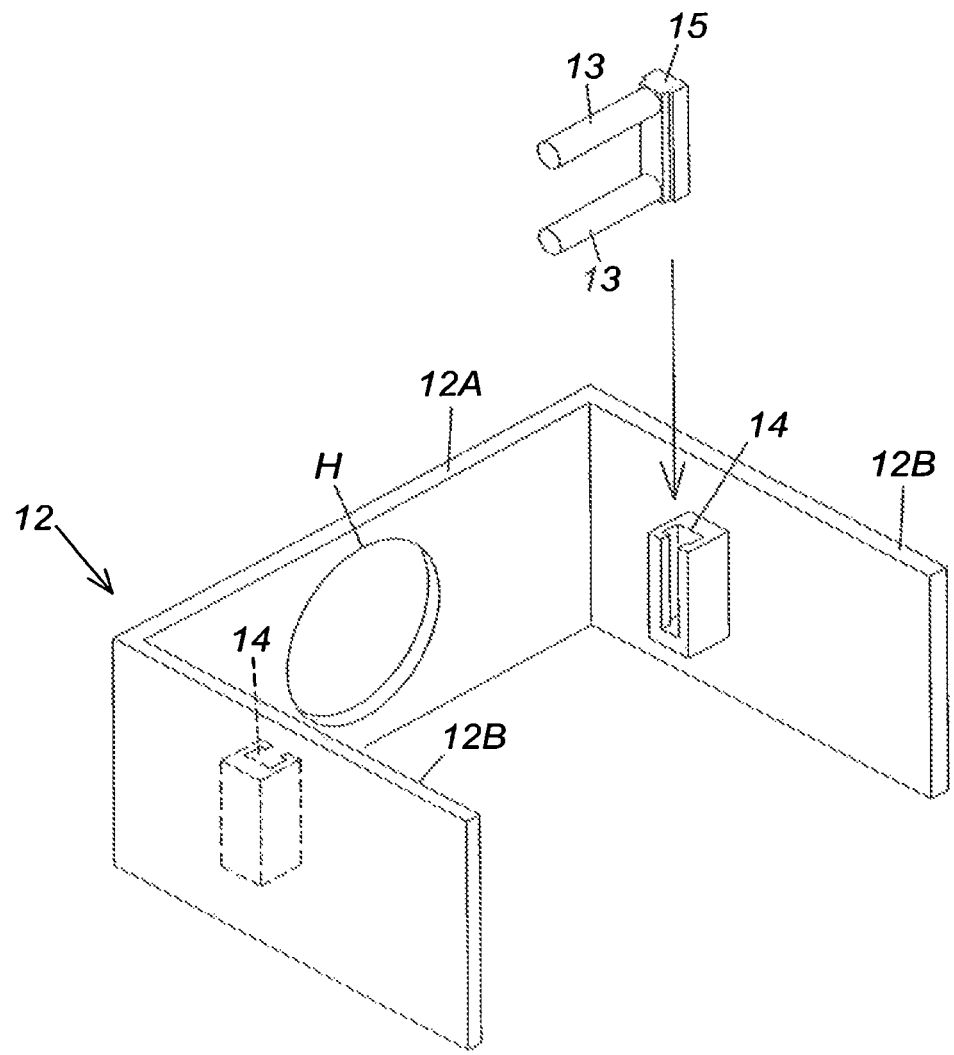
FIG. 5 is a perspective view of a support pin and a support frame.

FIGS. 1(*a*) and 1(*b*) are perspective views of an OBD connector protective cover to which the present invention is applied, FIG. 1(*c*) is a top view of the OBD connector protective cover and FIG. 1(*d*) is a rear view thereof, FIGS. 2(*a*) and 2(*b*) are cross-sectional views along a line A-A shown in FIG. 1(*d*) of the OBD connector protective cover, FIG. 3 is an exploded perspective view of the OBD connector protective cover in FIG. 1(*a*). FIGS. 4(*a*) and 4(*b*) are perspective views of a clip and FIG. 4(c) is a side view of the clip, and FIG. 5 is a perspective view of a support pin and a support frame.

Referring to FIGS. 1(a)-1(d), 2(a), 2(b) and 3, an OBD connector protective cover 1 of the present embodiment is a cover used as means for protecting an OBD connector 100 provided for a vehicle, and as a specific configuration, the OBD connector protective cover 1 is provided with a clip 3 provided with a pair of openable/closable lugs 2, a body cover 4 that covers the entire clip 3 including the pair of lugs 2, a key cylinder 5 provided on a front of the body cover 4 as opening/closing operation means for the pair of lugs 2, and a socket 6 provided on a rear face of the body cover 4 as an opening for inserting the connection terminal section 101 of the OBD connector 100 into the body cover 4.

With the OBD connector protective cover 1 of the present embodiment, the pair of lugs 2 are closed as shown in FIG. 2(b) through a key operation of the key cylinder 5, the connection terminal section 101 of the OBD connector 100 is held by the lugs 2, the connection terminal section 101 of the OBD connector 100 and the body cover 4 are thereby integrated together, and the body cover 4 constitutes an obstacle, thus disabling access to the connection terminal section from outside.

<<Details of Key Cylinder>>

The key cylinder 5 is attached and fixed to a front plate 4A of the body cover 4 using fixing means such as a nut and is provided with a lock pin 7 that can retractably protrude toward the clip 3 as shown in FIGS. 2(a) and 2(b). This lock pin 7 is configured to retractably protrude from a rear face of the key cylinder 5 by inserting a key (not shown) into a keyhole 8 (see FIG. 1(a)) on the front of the key cylinder 5.

<<Details of Clip>>

Referring to FIGS. 2(a) and 2(b), and FIGS. 4(a) to 4(c), the clip 3 is provided with a pair of lug plates 9, at distal ends of which the lugs 2 are formed, support means 10 for pivotably supporting the pair of lug plates 9 and an elastic plate 11 that is curved toward the lock pin 7 and connects rear end portions of the pair of lug plates 9.

When the lock pin 7 which is retracted inside the key cylinder 5 as shown in FIG. 2(a) protrudes from the key cylinder 5 as shown in FIG. 2(b) (hereinafter referred to as "key lock period"), the protruding lock pin 7 presses the elastic plate 11, causing it to be flattened. This causes the pair of lug plates 9 to rotate in a direction in which a distance between a pair of lug plate rear end portions 9R increases and a distance between a pair of lug plate distal end portions 9T decreases in association therewith (hereinafter this rotation will be referred to as "key lock direction rotation"), leaving the lugs 2 of the respective lug plates 9 closed with support pins 13, which will be described later, as fulcra.

Conversely, when the lock pin 7 protruding from the key cylinder 5 as shown in FIG. 2(b) is retracted into the key cylinder 5 as shown in FIG. 2(a) (hereinafter referred to as "key unlock period"), the elastic plate 11 that has been flattened so far as described above is elastically restored to its original condition as shown in FIG. 2(a). This causes the pair of lug plates 9 to rotate in a direction opposite to the key lock direction rotation, leaving the lugs 2 of the respective lug plates 9 open with the support pins 13, which will be described later, as fulcra.

The support means 10 is configured to pivotably support the lug plates 9 from both sides thereof using a support frame 12 and a plurality of support pins 13 in FIG. 5. The support frame 12 is made up of a front plate 12A provided with a through hole H that allows the key cylinder 5 to be inserted therethrough and two side plates 12B located on both sides thereof and the side plates 12B are each provided with an engagement groove 14 on inner surfaces thereof. Of the plurality of support pins 13, the two support pins 13 shown in FIG. 5 that support one side of the respective lug plates 9 are provided to stand on an insertion member 15 as integral parts thereof as shown in FIG. 5. The same applies to the two support pins 13 that support the lug plates 9 on the other side.

Pin holes 16 are opened in one side of the respective lug plates 9 in association with the two support pins 13 provided to stand on the insertion member 15 as described above as shown in FIGS. 4(a) to 4(c), and after inserting the support pins 13 into the pin holes 16, the insertion member 15 is inserted into the engagement groove 14 (see FIGS. 3 and 5), and the one sides of the respective lug plates 9 are pivotably supported by the support frame 12 and the support pins 13. The other sides of the respective lug plates 9 are also pivotably supported in a scheme and/or configuration similar thereto.

The shape of the lug 2 can be suitably changed as required. For example, the lug 2 can be formed into a serrated tooth shape like an alligator clip. The material of the lug 2 may also be suitably changed to rubber, resin, metal or the like as required.

By adopting a flat spring as the elastic plate 11, the OBD connector protective cover 1 of the present embodiment is configured such that the elastic plate 11 which is flattened during a key lock period is reliably elastically restored to its original condition during a key unlock period so that the lugs 2 are firmly kept open to the end. An elastic raw material other than the flat spring may also be adopted as the elastic plate 11.

<<Details of Body Cover>>

Referring to FIGS. 1(a) to 1(d), the body cover 4 has a box shape made up of a front plate 4A, a top plate 4B, a base plate 4C and side plates 4D on both sides, and a rear face thereof is opened as a socket 6 to insert the connection terminal section 101 of the OBD connector 100 into the body cover 4. In the stage of assembling and manufacturing the OBD connector protective cover 1 of the present embodiment, this socket 6 is used as an opening to arrange and/or accommodate the clip 3 in the body cover 4.

Though the body cover 4 is formed of resin, the material thereof is not limited to this, but the body cover 4 may be formed of any raw material other than resin as required.

<<Method for Using OBD Connector Protective Cover or the Like>>

A user who tries to protect the OBD connector 100 using the OBD connector protective cover 1 of the present embodiment first sets the OBD connector protective cover 1 in a key unlock state as shown in FIG. 2(a). To set the key unlock state, the user may insert the key into the keyhole 8 of the key cylinder 5 to cause the lock pin 7 to be placed into the key cylinder 5 through a key operation.

After the key unlock state is set as described above, the user inserts the connection terminal section 101 of the OBD connector 100 from the socket 6 into the body cover 4, causes the lock pin 7 to protrude from inside the key cylinder 5 through a key operation to set the OBD connector protective cover 1 in a key lock state as shown in FIG. 2(b).

In this way, the inserted connection terminal section 101 of the OBD connector 100 is held by the lugs 2, integrated with the body cover 4, and the body cover 4 constitutes an obstacle to disable access to the connection terminal section 101 of the OBD connector 100 from outside, making it thereby possible to prevent abuses of the OBD connector, for example, by connecting an illegal device to the connection terminal section 101 of the OBD connector 100 to access a computer of the vehicle.

As a specific configuration of the OBD connector protective cover 1 of the present embodiment described above, particularly as a configuration in which the connection terminal section 101 of the OBD connector 100 is integrated with the body cover 4 and the body cover 4 thereby becomes an obstacle to disable access to the connection terminal section 101 of the OBD connector 100 from outside, the configuration has been adopted in which the socket 6 is provided in the rear face of the body cover 4, the connection terminal section 101 of the OBD connector 100 is inserted from the socket 6 into the body cover 4, and the inserted connection terminal section 101 is held by the lugs 2 of the clip 3. For this reason, for example, even when the OBD connector 100 to be protected is firmly attached and fixed to the mounting plate of the vehicle, it is possible for anyone to simply prevent abuses of the OBD connector 100 by one-touch operation of just inserting the connection terminal section 101 into the socket 6 without any need to remove the OBD connector 100 from the mounting plate.

According to the OBD connector protective cover 1 of the present embodiment, the key cylinder 5 is provided on the front of the body cover 4, allowing anyone to clearly recognize the presence of the key cylinder 5 at a glance, strongly appealing the presence of the key cylinder 5 to an abuser of the OBD connector 100 in particular, and as a result, achieving a high effect of preventing abuses, for example, forcing the abuser to give up the abuse of the OBD connector 100.

What is claimed is:

1. An OBD connector protective cover that protects an OBD connector provided for a vehicle, comprising:
   a clip provided with a pair of openable/closable lugs;
   a body cover that covers the entire clip including the pair of lugs;
   a key cylinder provided on a front of the body cover as opening/closing operation means for the pair of lugs; and
   a socket provided in a rear face of the body cover as an opening for inserting a connection terminal section of the OBD connector into the body cover,
   wherein the pair of lugs are closed through a key operation with the key cylinder, the connection terminal section of the OBD connector and the body cover are integrated together by the lugs holding the connection terminal section of the OBD connector, and the body cover constitutes an obstacle to thereby disable access to the connection terminal section from outside.

2. The OBD connector protective cover according to claim 1,
   the key cylinder comprises a lock pin that can retractably protrude toward the clip direction,
   the clip comprises:
   a pair of lug plates, the lugs being formed at distal ends thereof;
   support means for pivotably supporting the pair of lug plates; and
   an elastic plate that is curved toward the lock pin and connects rear ends of the pair of lug plates,
   wherein the elastic plate is pressed and flattened by the lock pin that protrudes from the key cylinder, the pair of lug plates are thereby rotated in a direction in which a distance between the rear ends of the pair of lug plates increases, and the pair of lug plates are rotated in a direction in which a distance between distal ends of the pair of lug plates decreases in association therewith, and the lugs of the respective lug plates are closed.

* * * * *